United States Patent
Baffes

(10) Patent No.: US 11,353,150 B2
(45) Date of Patent: Jun. 7, 2022

(54) SYSTEM FOR SEALING FLANGED CONNECTIONS

(71) Applicant: Fermi Research Alliance, LLC, Batavia, IL (US)

(72) Inventor: Curtis M Baffes, Batavia, IL (US)

(73) Assignee: FERMI RESEARCH ALLIANCE, LLC, Batavia, IL (US)

( * ) Notice: Subject to any disclaimer, the term of this patent is extended or adjusted under 35 U.S.C. 154(b) by 457 days.

(21) Appl. No.: 16/425,222

(22) Filed: May 29, 2019

(65) Prior Publication Data

US 2020/0378531 A1 Dec. 3, 2020

(51) Int. Cl.
*F16L 23/036* (2006.01)
*F16L 23/18* (2006.01)

(52) U.S. Cl.
CPC .............. *F16L 23/036* (2013.01); *F16L 23/18* (2013.01)

(58) Field of Classification Search
CPC ......... F16L 23/02; F16L 23/12; F16L 23/036; F16L 23/162; F16L 23/18
USPC .................... 285/18, 19, 368, 364, 412, 900
See application file for complete search history.

(56) References Cited

U.S. PATENT DOCUMENTS 7,641,240 B2 * 1/2010 Seaton ................. F16L 23/036
285/368

OTHER PUBLICATIONS

Williams et al., "Advancement of the segment support system for the Thirty Meter Telescope primary mirror," Proc. SPIE 7018, Advanced Optical and Mechanical Technologies in Telescopes and Instrumentation, 701810 (Jul. 23, 2008); doi: 10.1117/12.790176; 17 pages.
Ponslet et al., "Development of the primary mirror segment support assemblies for the Thirty Meter Telescope," Proc. SPIE 6273, Optomechanical Technologies for Astronomy, 627319 (Jul. 6, 2006); doi: 10.1117/12.670604; 20 pages.
Stepp et al., "Gemini primary mirror support system," Proc. SPIE 2199, Advanced Technology Optical Telescopes V, (Jun. 1, 1994); doi: 10.1117/12.176192; 17 pages.
Nelson et al., "The Segmented-Mirror Control System Prototype for the Ten Meter Telescope: A Status Report," Proc. SPIE 0444, Advanced Technology Optical Telescopes II, (Nov. 3, 1983); doi: 10.1117/12.937987; 14 pages.

* cited by examiner

*Primary Examiner* — Aaron M Dunwoody
(74) *Attorney, Agent, or Firm* — Loza & Loza LLP; Kevin L. Soules

(57) ABSTRACT

A flange sealing system can include a loading member layer adapted to receive a sealing force thereon, at least one intermediate member receiving the sealing force from the loading member and adapted to distribute the load force to branch members in subsequent layers, and at least one contact member adapted to apply the sealing force evenly around a flange and press a surface of the flange and against at least one of a second flange surface or a cap to seal an opening associated with the flange via at least one of connection to the second flange surface or the cap. The system can be provided in the form of a first pipe receiving section and a second pipe receiving section for securing two flanges together with associated pipes with pivot points distributed about the first and second pipe receiving section and distributing even pressure around the flanges.

17 Claims, 9 Drawing Sheets

1100

SYSTEM FOR SEALING FLANGED CONNECTIONS

STATEMENT OF GOVERNMENT RIGHTS

The invention described in this patent application was made with Government support under the Fermi Research Alliance, LLC, Contract Number DE-AC02-07CH11359 awarded by the U.S. Department of Energy. The Government has certain rights in the invention.

TECHNICAL FIELD

The embodiments are generally related to flanged connections, and systems and method for sealing flanged connections. More particularly, the embodiments are related to a system for the sealing, i.e., coupling and closing, flanged connections.

BACKGROUND

A whiffletree (also commonly referred to as whippletree) is a mechanism that has been used to distribute force evenly through linkages. It has also been referred to as an equalizer, leader bar, or doubletree. Its typical design can include of a bar pivoted at or near the center, with force applied from one direction to the pivot and from the other direction to the tips. Several whiffletrees can be used in series to further distribute force, such as to simulate pressure over an area as when applying loading to test airplane wings. Whiffletrees can be used either in compression or tension applications. They have also been used for subtraction and addition calculations in mechanical computers. Tension whiffletrees, for example, are widely known for their used in artful hanging mobiles.

Whiffletrees have been used as a practical design to distribute tension forces from a point load to the traces of draught animals (the traces are the chains or straps on each side of the harness, on which the animal pulls). A whiffletree is a very old invention for distribution of loads in multi-animal teams. Referring to FIG. 1, an illustration of a basic whiffletree 100 is shown wherein a load pulling down from ring 105 set on a bar 110 is equally distributed among three support sections 111, 112, 113. For these, the whiffletree consists of a loose horizontal bars 121, 122, 123, 124, 110 interconnected by rings 130 between the draught animal and its load. The center of each bar is connected to the load, and the traces 115, 116 attach to its ends. Whiffletrees have traditionally been used especially when pulling a dragged load such as a plough, harrow, log or canal boat or for pulling a vehicle (by the leaders in a team with more than one row of animals). A swingletree, or singletree, is a special kind of whiffletree used for a horse-drawn vehicle. The term swingletree is sometimes used for draught whiffletrees.

A whiffletree can balance the pull from each side of the animal, preventing the load from tugging alternately on each side. It also keeps a point load from pulling the traces in and onto the sides of the animal. If several animals are used abreast, further whiffletrees may be used behind the first. Thus, with two animals, each can have its own whiffletree, and a further one can balance the loads from their two whiffletrees—an arrangement sometimes known as a double-tree, or for the leaders in a larger team, leader-bars. With three or more animals abreast, even more whiffletrees are typically needed; some may be made asymmetrical to balance odd numbers of animals. Multiple whiffletrees balance the pulls from the different animals, ensuring that each takes an equal share of the work.

Another example use of a whiffletree-like structure can be found in the form of a windshield wiper structure 210, as illustrated in the photograph of FIG. 2. Here, a compression load from a sprung wiper arm 215 is forced onto the receiver 205 of the wiper blade housing 220. The illustrated wiper blade housing 220 has a structure of four flexible pressure point pairs 225 that evenly distribute pressure along the rubber wiper blade 230 when it is in contact with a windshield (not shown). Here, the whiffletree can include at least one loading member layer (e.g., wiper arm 215), at least one intermediate member (e.g., receiver 205), which serves to distribute a load to branch members in subsequent layers (e.g., flexible pressure point pairs 225), and at least one contact member (e.g., wiper blade 230). Intermediate members can accommodate pivots to permit relative motion between members in adjacent layers. Layers can accommodate pivots even where the tree is not branching. For example, layers can be included to allow orthogonal pivots, which combine to achieve universal joint function. There can be at least 1 member in the 1st intermediate member layer, but there could be more (plausibly 2, theoretically up to 3). There can also be at least 1 member in the 2nd intermediate member layer, but there could be more (plausibly up to 4, theoretically up to 9). There can be at least 2 members in the 3rd intermediate layer, but also could include more (plausibly up to 8, theoretically up to 27). Once layers start branching, each member can distribute their load to 2-3 members in the next layer. There is no theoretical limit to number of contact members in the contact layer (e.g., there can be 2×-3× the number of members in the final "ith" intermediate layer). Each member in the contact layer could spread a load to 2 or 3 contact points. There will typically be a minimum of two contact points, and there is no theoretical limit to the number of contact points used (e.g., there can be 2 to 3 contact points per member in the contact layer).

A flange is an external or internal ridge, or rim (lip), for strength, as the flange of an iron beam such as an I-beam or a T-beam; or for attachment to another object, as the flange on the end of a pipe, tube, steam cylinder, etc., or on the lens mount of a camera; or for a flange of a rail car or tram wheel. Thus flanged wheels can include wheels with a flange on one side to keep the wheels from running off the rails. The term "flange" can also be used for a kind of tool used to form flanges. Pipes with flanges can typically be assembled and disassembled easily. Flanges can also be a plate or ring to form a rim at the end of a tube or pipe when fastened to the tube or pipe (for example, a closet flange). A blind flange generally refers to a plate for covering or closing the end of a tube or pipe. A flange joint generally refers to a connection of tubes/pipes, where the connecting pieces have flanges by which the parts are bolted together. Sometimes collars can be used to secure (e.g., couple) flanges together or close a flange ending, and the collars are typically bolted together by several bolts, which compresses the flanges together, or a cap onto a flange ending, generally with the objective of creating a seal where the flanges, or cap and flange, become compressed together.

Although the word "flange" can generally refer to the actual raised rim or lip of a fitting, many flanged plumbing fittings are themselves known as "flanges". The principal design of the flange face can include two independent seals. The first seal can be created by application of seal seating stress at the flange heel, but it is not straightforward to ensure the function of this seal. Theoretically, the flange can remain in contact along its outer circumference at the flange faces for all allowable load levels that it is designed for. The main seal can be the seal ring. The seal ring force can be provided by the elastic stored energy in the stressed seal ring. Any heel leakage will give internal pressure acting on the seal ring inside intensifying the sealing action. This however requires the ring to be retained in the theoretical location in the ring groove, which is difficult to ensure and verify during installation.

The design of a flange sometimes aims at preventing exposure to oxygen and other corrosive agents. Thus, this prevents corrosion of flange faces, the stressed length of the bolts and the seal ring. This however depends on the outer dust rim to remain in satisfactory contact and that the inside fluid is not corrosive in case of leaking into the bolt circle void. It can be a challenge to close and seal flange connections.

What is needed in the art is an improved manner of closing and sealing flanges. It is desirable that a system and methods can provide equal pressure around a flange without the need to make adjustments of several distributed fasteners (e.g., bolts and nut pairs) distributed along collars at each side of mating flanges. The present inventor believes that the incorporation of whiffletree-like design considerations can resolve this need.

SUMMARY OF THE EMBODIMENTS

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is a feature of the embodiment to provide an improved flange closure and sealing system.

In accordance with a feature of the preferred embodiment of the invention, a system for sealing flanged connections can include at least one loading member layer adapted to receive a load force thereon, at least one intermediate member receiving the load force from the at least one loading member and adapted to distribute the load force to branch members in subsequent layers, and at least one contact member adapted to apply the load force evenly around a flange and press a surface of the flange and against at least one of a second flange surface or a cap to seal an opening associated with the flange via at least one of connection to the second flange surface or the cap.

In accordance with a feature of the preferred embodiment of the invention, a system for sealing flanged connections can include pivot joints connecting the at least one loading member to the at least one intermediate member to permit relative motion between the at least one loading member and the at least one intermediate member.

In accordance with a feature of the preferred embodiment of the invention, pivots can also exist between every layer in a whiffletree—e.g., between intermediate layers and between the last intermediate layer and the contact layer.

In accordance with a feature of the preferred embodiment of the invention, a system for sealing flanged connections can include contact points coupled to the at least one contact member enabling the at least one contact member to apply the load force evenly around a flange.

In accordance with a feature of the preferred embodiment of the invention, a system for sealing flanged connections can include at least two intermediate members in a 1st intermediate member layer each applying the load force to at least two additional intermediate members in a 2nd intermediate member layer, and the at least two additional intermediate members each apply the load force to at least two contact members.

In accordance with yet another feature of the preferred embodiment of the invention, a system can be provided for securing flanges that includes a first pipe receiving section and a second pipe receiving section that can secure two flanges together with pivot points distributed about the first and second pipe receiving sections and pressure can be evenly distributed around the flanges as pressure is applied by a fulcrum and preload fastener connecting a first loading member associated with the first pipe receiving section and a second loading member associated with the second pipe receiving section.

In accordance with another feature, a first pipe receiving section can include a first loading member and first pivot points adapted to interface with a first flange associated with a first pipe. The pivot point can be distributed around the first flange and can be connected to the contact members of the first pipe receiving section via intermediate members and the first intermediate members can be connected to the first base portion and the pivots by a plurality of pivots and/or intermediate members.

In accordance with another feature, a second pipe receiving section includes a second loading member with pivot points adapted to interface with a second flange associated with a second pipe. The second pivot points can be distributed around the second flange and can be connected to the contact members of the second pipe receiving section via second intermediate members and the second intermediate members can be connected to the second loading member and the second pivot points by a second plurality of pivots and/or intermediate members.

In accordance with another feature, a static member (i.e. a fulcrum) can be provided to connect the loading member of the first pipe receiving section to the loading member of the second pipe receiving section.

In accordance with another feature, a preload fastener can be provided to connect the loading member of the first pipe receiving section to the loading member of the second pipe receiving section.

In accordance with another feature, the first pipe receiving section and a second pipe receiving section can secure the first flange and associated first pipe together with the second flange and associated second pipe by pressure evenly distributed among the pivot points distributed about the first and second pipe receiving section as applied by the static member and the preload fastener connecting a first loading member associated with the first pipe receiving section and a second loading member associated with the second pipe receiving section.

In accordance with yet another feature, the first pipe receiving section and the second pipe receiving section can be provided in two halves (e.g., clamshell design) to be securable around existing piping by a plurality of fasteners prior to securing the first pipe receiving section to the second pipe receiving section with the fulcrum and the preload fastener.

A whiffletree as used in accordance with the embodiments, can include at least one loading member layer, at least one intermediate member, which serves to distribute a load to branch members in subsequent layers, and at least one contact member. Intermediate members can accommodate pivots to permit relative motion between members in adjacent layers. Layers can accommodate pivots even where the tree is not branching. For example, layers can be included to allow orthogonal pivots, which combine to achieve universal joint function. There can be at least one member in the 1st intermediate member layer, but there could be more. (Plausibly two, theoretically up to three). If there is a $2^{nd}$ intermediate member layer, it would contain at least 1 member (but could be more. Plausibly up to four, theoretically up to nine). If there is a $3^{rd}$ intermediate member layer, it would contain at least two members (but could be more. Plausibly up to eight, theoretically up to twenty-seven). Once layers start branching, each member distributes load to two or three members in the next layer. There is no theoretical limit to number of contact members in the contact layer (2x-3x the number of members in the final "ith" intermediate layer. Each member in the contact layer would spread a load to two or three contact points. The will typically be a minimum of two contact points. There is no theoretical limit to the number of contact points—although at least two to three contact points per member in the contact layer would be preferred.

Pivots separate each of the layers described above. Pivot can include: flexural; axisymmetric, ball, ball-and-socket, bearing, bushing, roller, hinge, etc. Contact (e.g. knife-edge, static pivot point, rocker); Compliant member pivot can include incorporate of a rubber pad, or a spring.

Tension members can be either a fastener (something tightened to apply load) or static member (e.g. a fulcrum rod). An axial load can be applied by tightening at least 1 fastener. The axial load can be shared by at least 2 tension members (but up to 3). So the specific options would be: 1 fastener+1 static member (prototype design/embodiment); 2 fasteners; 3 fasteners; 1 fastener+2 static member; 2 fasteners+1 static member.

Architecture options for a whiffletree fastener include in accordance with the embodiments can include: captured, as in preferred embodiment, clamshell—2 halves (as in alternate embodiment); segmented—including multiple sectors; and hybrid—including both captured and segmented components.

The aforementioned aspects and other objectives and advantages can now be achieved as described herein.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
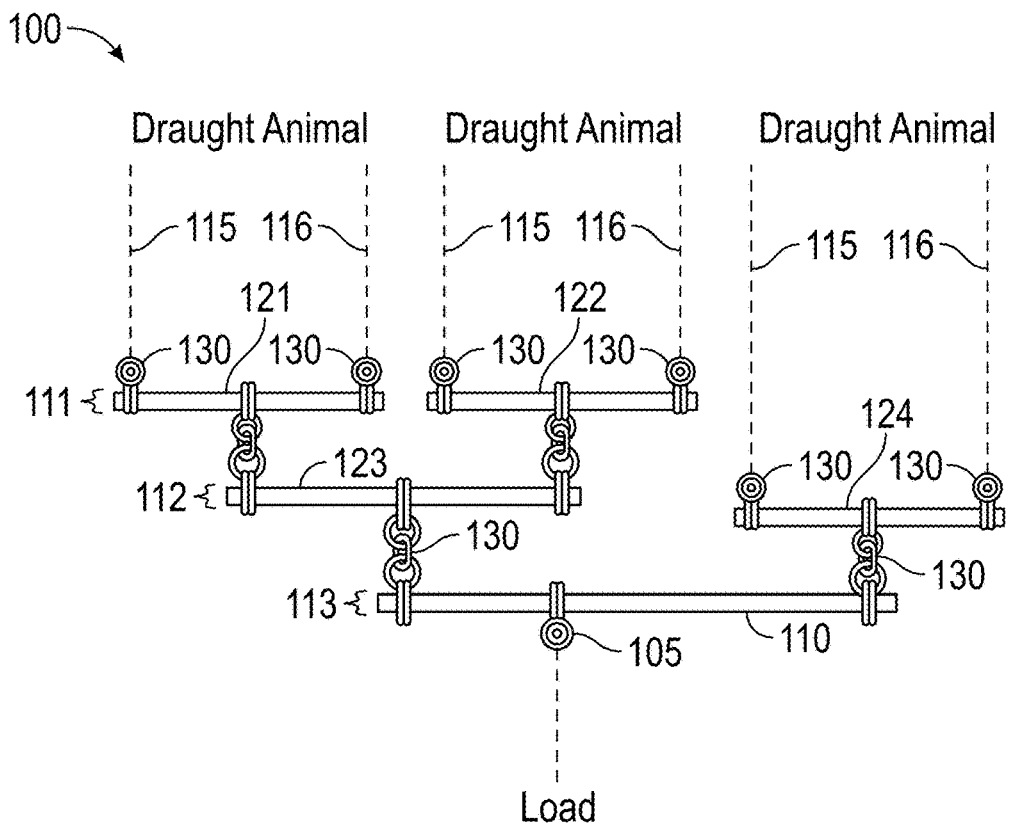
FIG. 1, labeled as prior art, illustrates a whiffletree structure example used for distributing tension when pulling a load.
Figure 2:
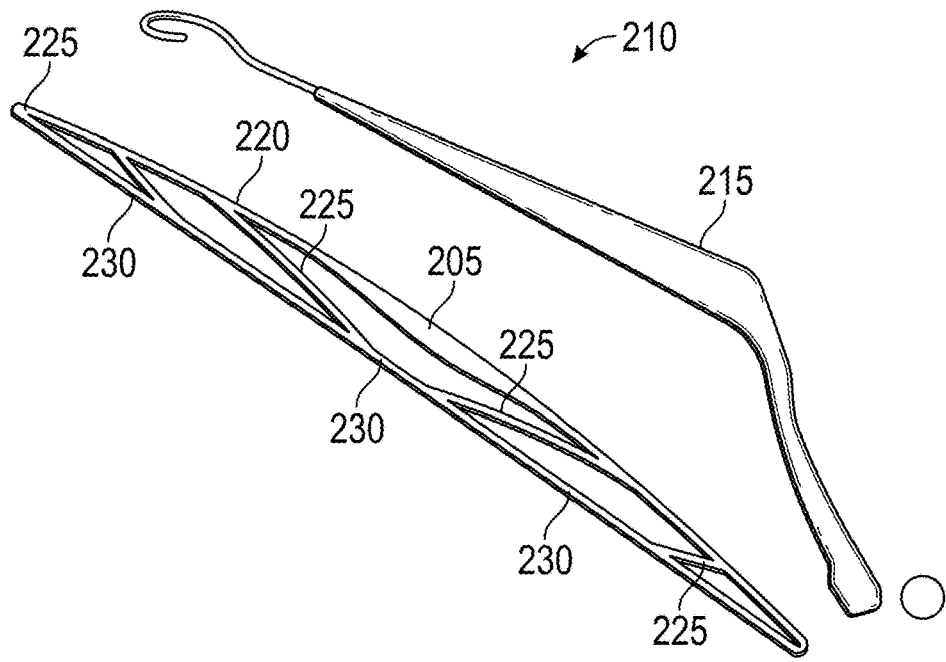
FIG. 2 illustrates another whiffletree structure example used for distributing compression force from a load over wiper blade.

The particular values and configurations discussed in the following non-limiting examples can be varied, and are cited merely to illustrate one or more embodiments and are not intended to limit the scope thereof.

Example embodiments will now be described more fully hereinafter with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, un-recited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

A distinction between pipes and tubes should be appreciated, where "pipes" can refer to one specific system of material sizing that goes by the inner diameter and "tubes" can refer to one specific system of material sizing that goes by the outer diameter. Flanges can also be used on enclosures. Enclosures can be any enclosed volume, including pipes, tubes, square sections, custom cross sections, etc. Blank Flanges can refer to flanges without a connected enclosed volume, i.e. a cap or a cover to close a system. Symmetric flanged connections can refer to the connection of like units of any of the foregoing. Asymmetric flanged connections can refer to the connection of mix-and-match version of any of the foregoing. Single-flange connections can include a connection of one flange to a surface or body. The surface can have an appropriate sealing feature (e.g. a gasket groove), but no flange. For purposes of this disclosure, usage of terms pipes and tubes is meant to be interchangeable, and without suggesting a limitation as to application of embodiments of the invention.

Figure 3:
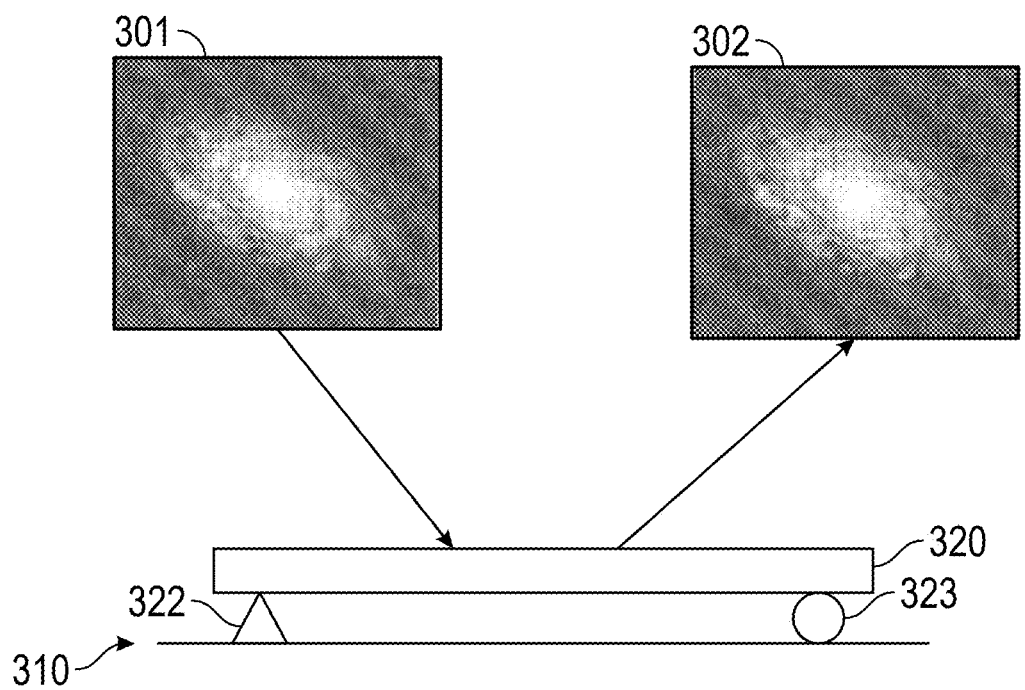
FIG. 3 illustrates a kinematic support includes a mirror supported by a fixed support and a roller support.
Figure 4:
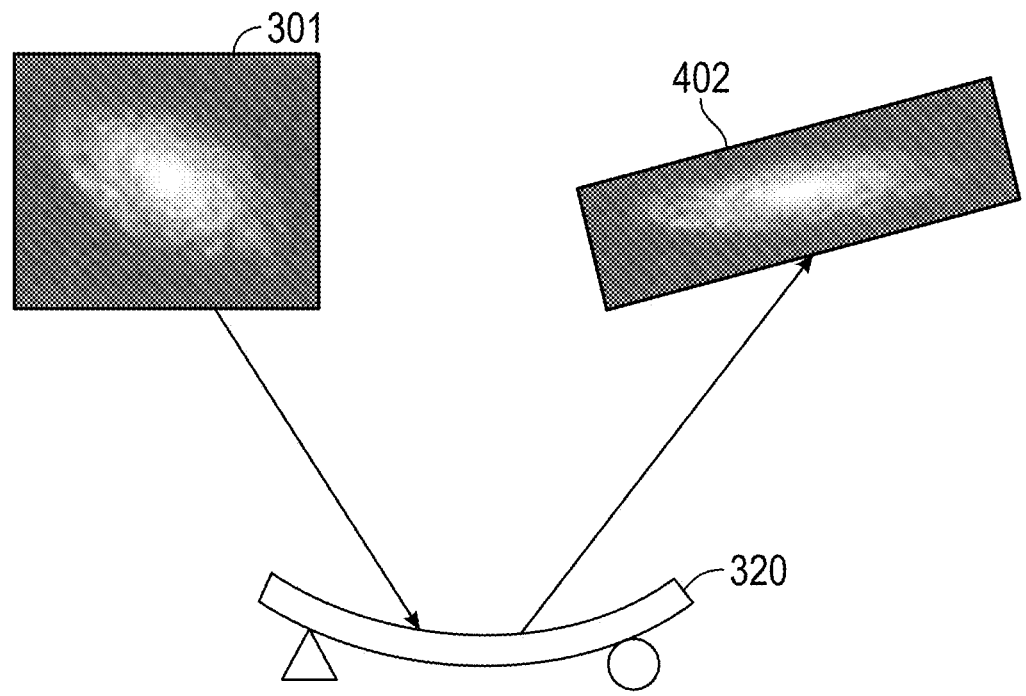
FIG. 4 illustrates a kinematic support that includes a mirror supported by a fixed support and a roller support, but with loads causing the mirror to deflect.
Figure 5:
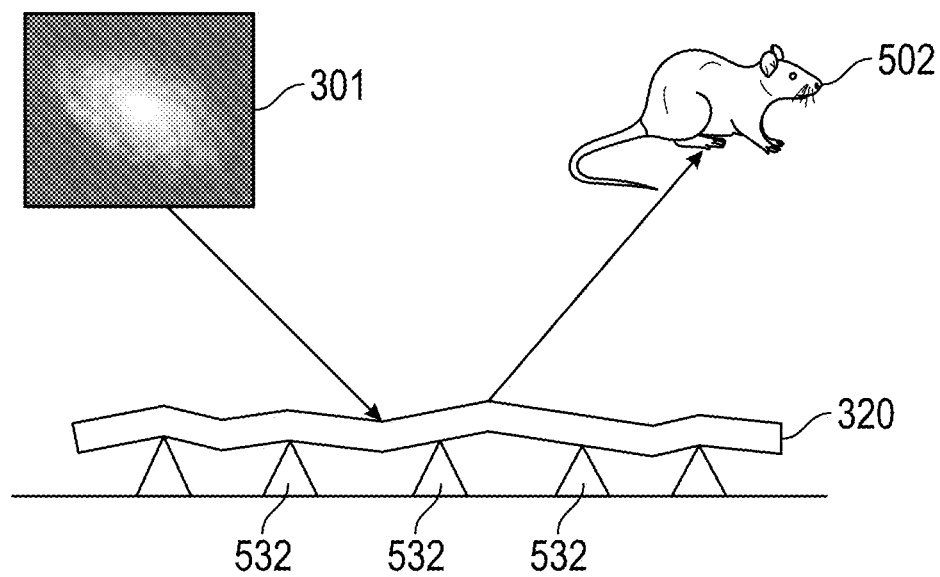
FIG. 5 illustrates a non-kinematic support includes a mirror supported by a fixed support and an adjustable support, but with loads causing the mirror to deflect, but with the addition fixed supports added to support the mirror, but introducing other optical aberrations with changes in mechanical and thermal loading due to mechanical over-constraint.

Kinematic (statically determinant) structures are useful to support optics while maintaining inherent surface quality. As illustrated in FIG. 3, a kinematic support 310 for an optical system can include a mirror 320 supported by a fixed support 322 and a roller support 323. Ideally, an image 301 would be almost perfectly reflected by the mirror 320 as a reflected image 302. The inherent stiffness of the optics, however, may not be enough to resists loads, causing the mirror 320 to deflect as shown in FIG. 4. When this happens the image 301 is no longer accurately reflected in the resulting reflected image 402. To correct this problem, addition fixed supports 532 can be added to support the mirror 320 as shown in FIG. 5. The additional supports 532, however, can introduce other optical aberrations with changes in mechanical and thermal loading. The result is managed gravity deflection, but non-kinematic support, resulting in reflected image distortions 502.

Figure 6:
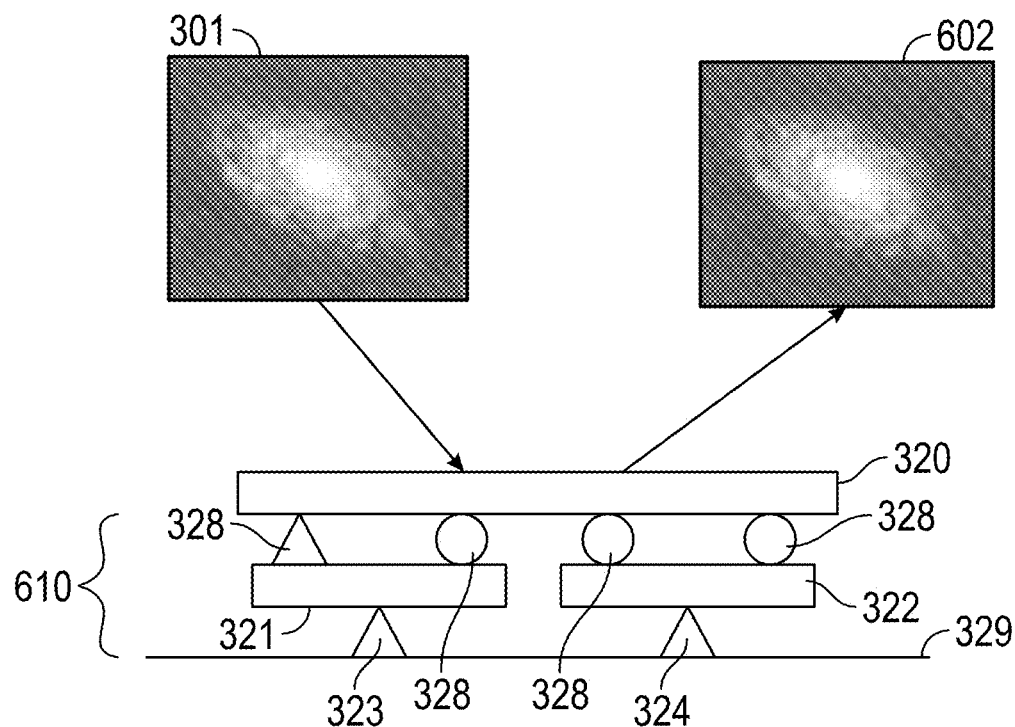
FIG. 6 illustrates adding a distributed support to a mirror through a whiffletree-designed structure, wherein support is more distributed and still kinematic. Aberrations associated with mechanical over-constraint are eliminated.

Designs for large telescopes can use whiffletrees to support the optical elements. The tree provides distributed mechanical support, reducing localized mechanical deflections, which in turn reduces optical distortion. Unlike the applications described above, which are two-dimensional, the whiffletrees in telescope mirror support cells are three-dimensional designs, since the tree must support multiple points over an area. Referring to FIG. 6, by adding distributed support to a mirror 320 through a whiffletree structure 610, support is more distributed and still kinematic. Support to the mirror 320 can be more evenly applied from contact points 328 supporting by intermediate members 321-322, which are each further supported by pivot points 323 and 324, respectively, which are resting on a surface 329 that represents the source of force reaction "F" for the structure. Therefore, a reflection of the image 301 can be more accurately reflected by a reflected image 602 despite gravity and thermal forces that may be affecting the mirror 320.

Figure 7:
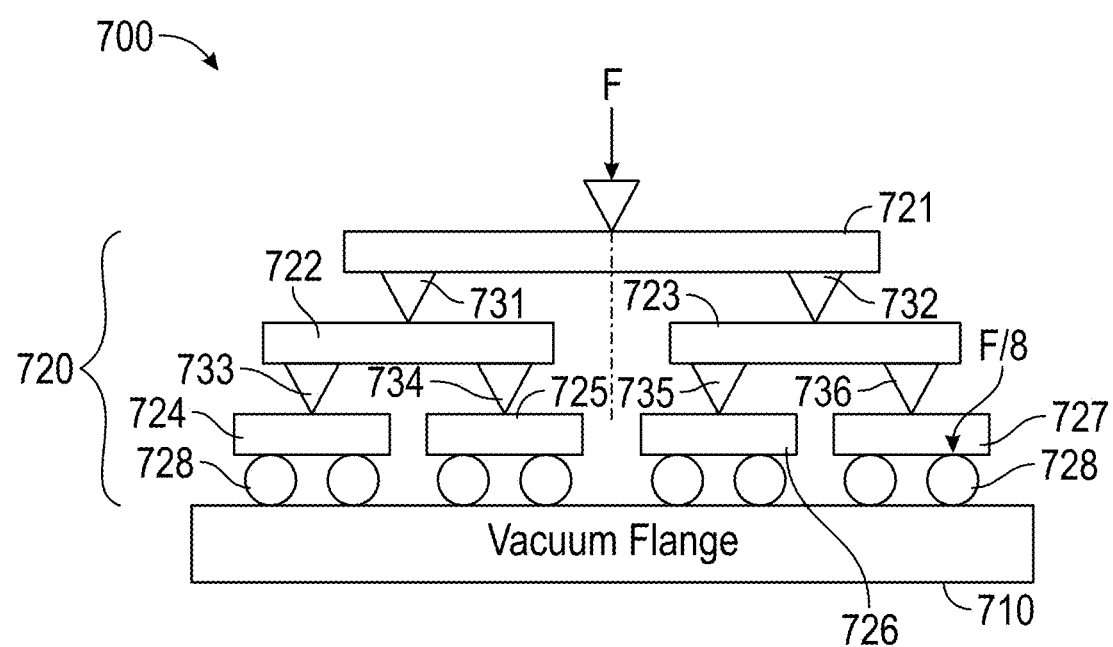
FIG. 7 illustrates a flange sealing structure wherein a sealing force "F" (e.g., compression force) can be evenly applied to a vacuum flange using a whiffletree structure, and wherein the force "F" can be evenly distributed through the load dividing structure that includes a loading member layer, intermediate member layer and a contact member layer.

Based on an understanding of whiffletrees, it is possible to provide another application where distributed loading can be an advantage, in accordance with features of the present embodiments. Flange sealing can be enhanced where evenly distributed compression force is applied to the flange interface. A flange sealing structure 700 is illustrated in FIG. 7. As shown in FIG. 7, compression from a sealing force "F" can be evenly applied to a vacuum flange 710 using a whiffletree structure 720, wherein the force "F" can be evenly distributed through the load dividing whiffletree structure 720. The whiffletree structure 720 can include a loading member 721, intermediate members 722-723, and contact members 724-727. The load is initially received at the loading member 721 and then it can be divided into two pivot points 731-732 and distributed onto the intermediate members 722-723. The load can then be divided into two more pivot points 733-736 from each of the intermediate members 722-723 and applied to the contact members 724-727. The load then can be applied directly to the vacuum flange from the contact member 724-727, or the load can then be further divided at the contact members 724-727 and applied by eight contact points 728 onto the vacuum flange 710, resulting in pressure being evenly distributed along a vacuum flange 710. As illustrated in this example, the initial force "F" was evenly divided by the whiffletree structure 720 into F/8, or eight contact points 728.

Figure 8:
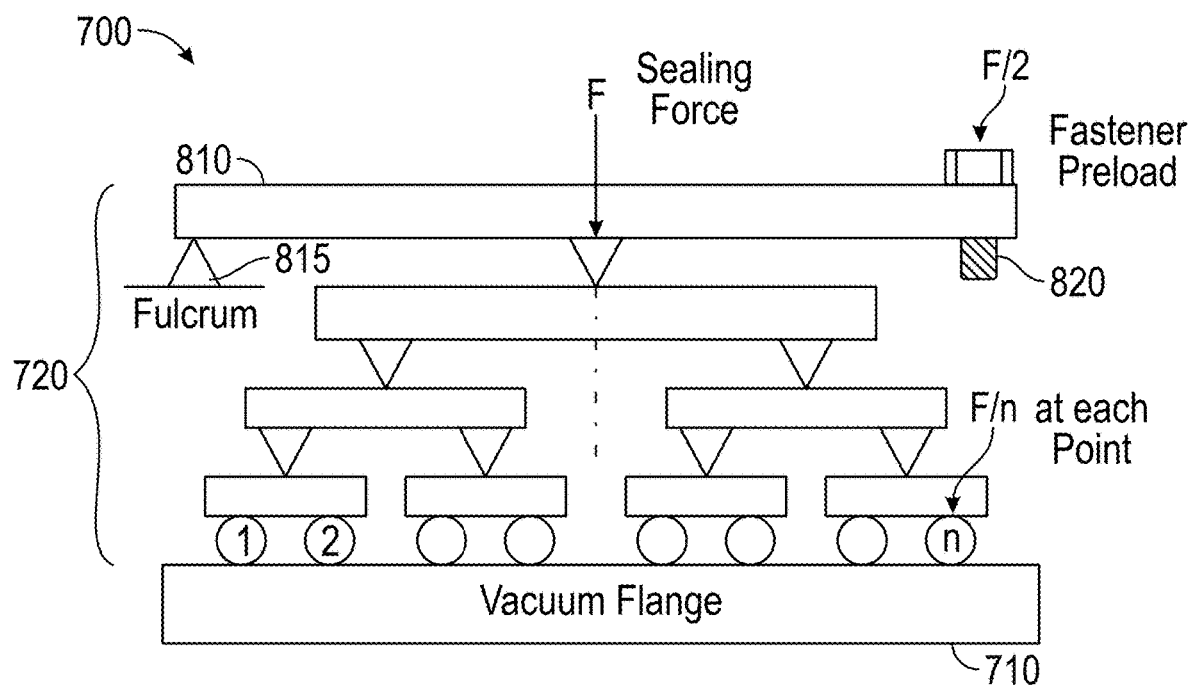
FIG. 8 illustrates the flange sealing structure of FIG. 7 with a lever being used as a loading member to apply compression force to the whiffletree structure onto a flange.

Referring to FIG. 8, an embodiment of the flange sealing structure 700 is further illustrated with a lever 810 being used to apply the main (e.g., undivided) force to the whiffletree structure 720. The lever 810 can be connected to and secured by a fulcrum 815 and can also be connected to a screw fastener 820. The screw fastener 820 can be used to adjust the force placed onto the whiffletree structure 720 by the lever 810, shown as F/2 because force can be caused at the fulcrum 815 and fastener locations (fastener preload), and ultimately can place even force upon each of the points (e.g., F/8) along the flange as the force is divided through the whiffletree structure 720.

Figure 9:
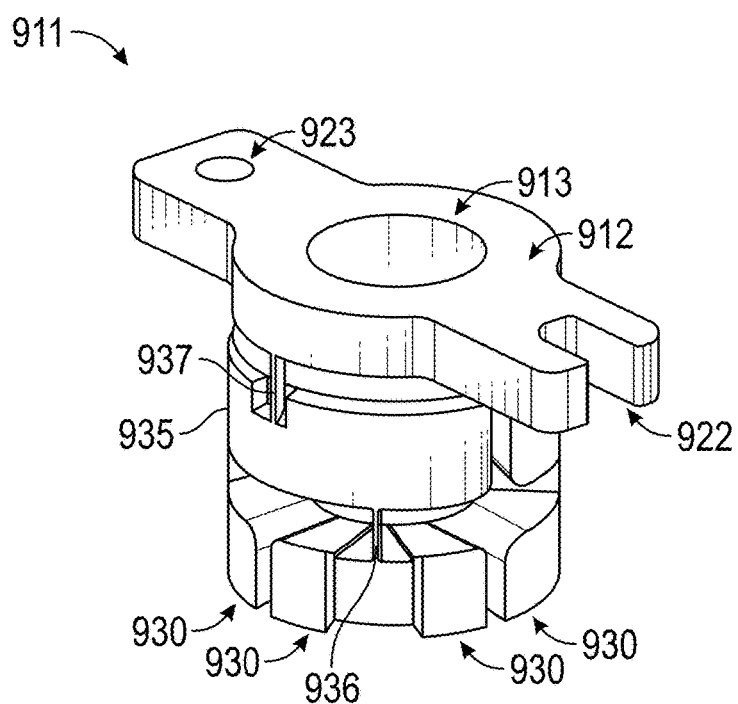
FIG. 9 illustrates a first pipe receiver including whiffletree structure, in accordance with an embodiment of the invention.

Referring to FIG. 9, a first pipe receiver 911 including whiffletree structure designs, as described with respect to FIGS. 7-8, is illustrated in accordance with an embodiment of the invention. A loading member 912 can include a fulcrum rod receiver 922 and a first preload fastener receiver 923. The loading member 912 is also representative of a lever as described in FIG. 8. The first pipe receiver 911 can be placed over a pipe matching the diameter of a center hole 913 formed through the center of the first pipe receiver 911. Downward pressure placed on the loading member 912 can be evenly applied onto a flange (not shown) by contact members 930 at an end of the first pipe receiver 911 disposed opposite of the loading member 912. The contact members 930 can make contact with flange surfaces at their respective ends. The contact members are also representative of the contact members 724-727 and contact points 728 as described in FIG. 7. From this perspective, contact members 930 are shown connected to a intermediate member 935 by a pivot point 936. The intermediate member 935 can then be further connected to the loading member 912 by another pivot point 937. The intermediate member 935 is also representative of the intermediate members 722-723 described in FIG. 7. The pivot points 936-937 are also representative of Pivot Points 731-736 as described in FIG. 7. In this example, pivots are implemented as flexures. This structure can be replicated around a circumference of the first pipe receiver 911 as a Whiffletree structure with contact members 930, intermediate members 935 being connected to the load member 912 by a plurality of pivot points similar to pivot points 936-937. The pivot points 936-937 can provide flexibility to the contact members 930 so they can easily interface around and make even contact with the circumference of flanges.

Figure 10A:
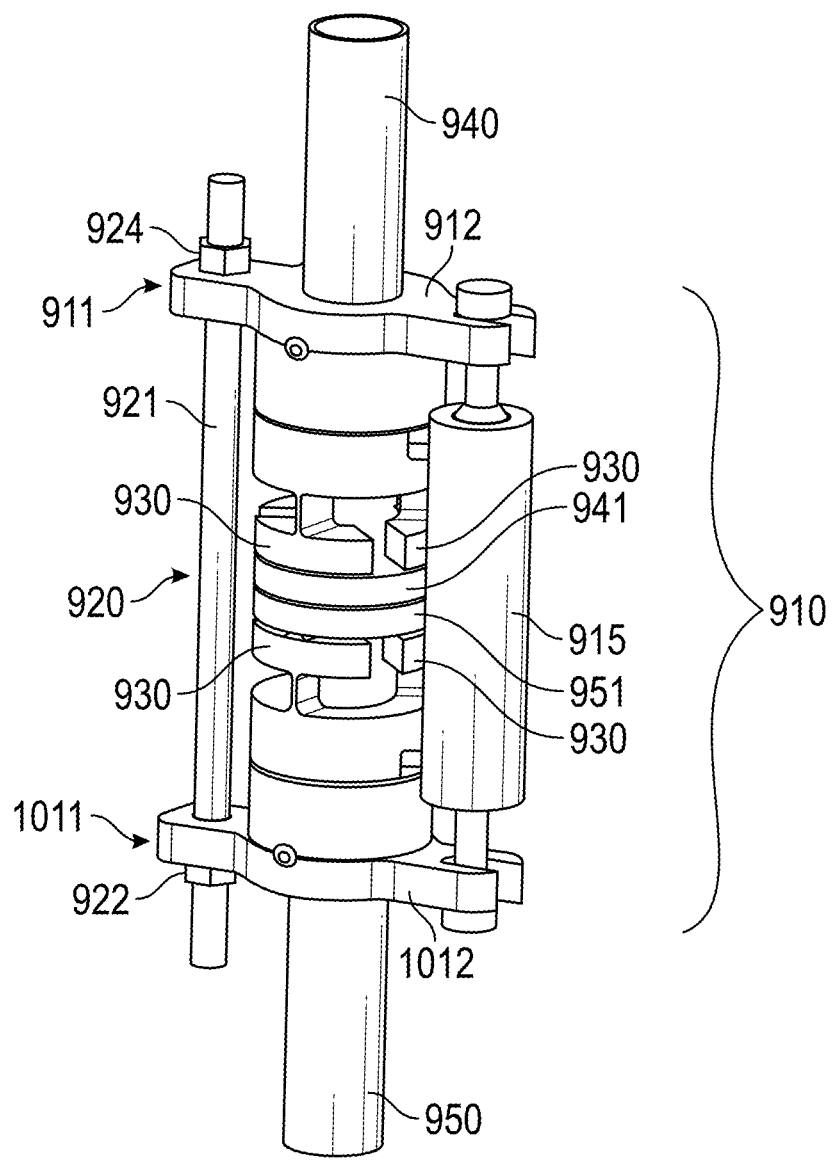
FIGS. 10A-10C illustrate a whiffletree structure providing closing sealing flanges in accordance with features of a preferred embodiment of the invention.
Figure 10B:
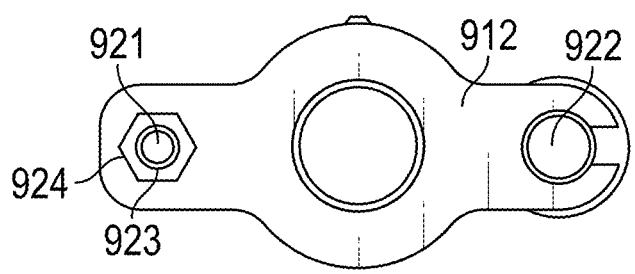
Figure 10C:
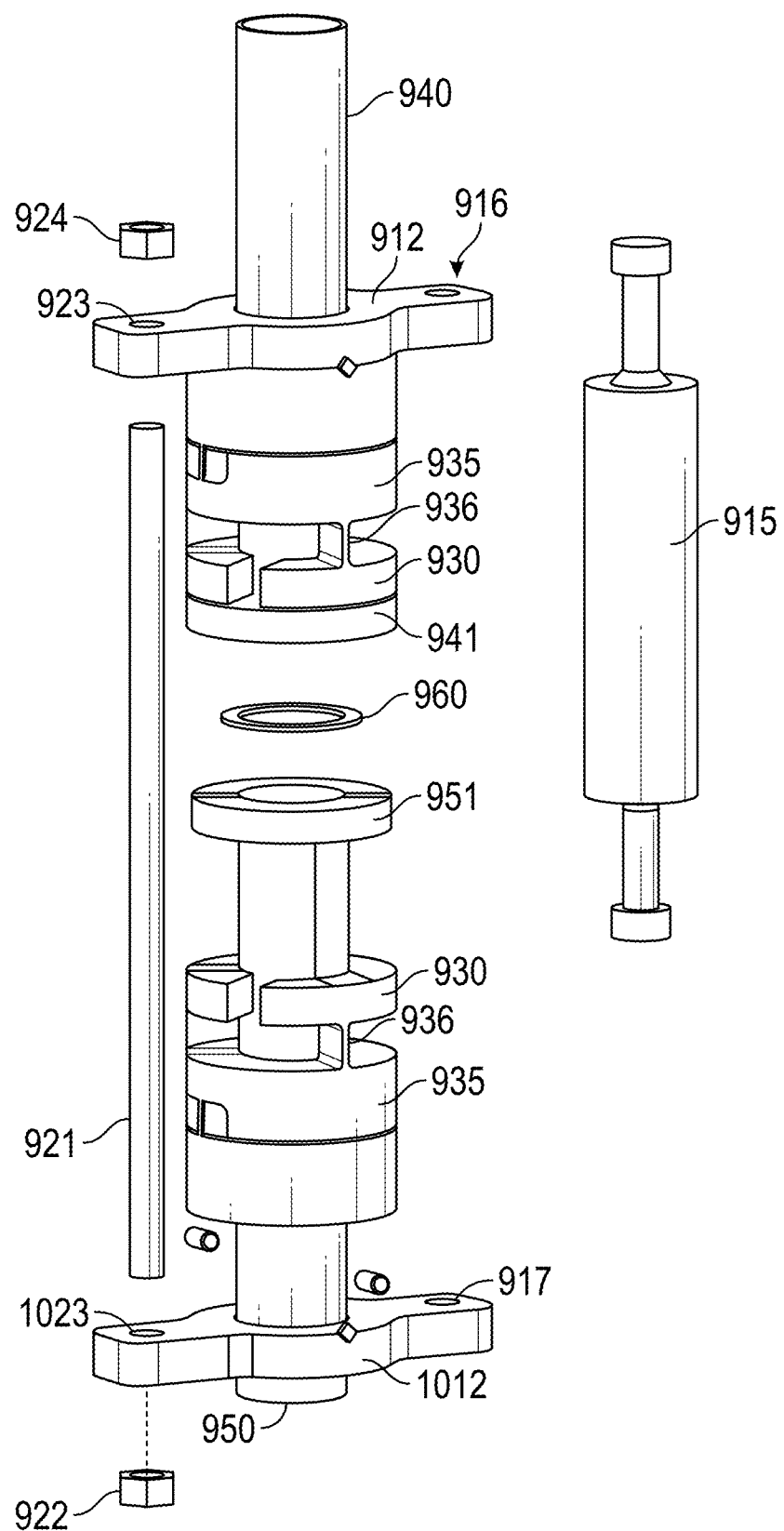

FIGS. 10A-10C illustrates a whiffletree structure in accordance with features of a preferred embodiment of the invention. Referring to FIG. 10A, a fulcrum rod 915 can connect the first base portion 912 (e.g., loading member) of the first pipe receiver 911 to a second base portion 1012 (e.g., second loading member) of the second pipe receiver 1011. Note that the second pipe receiver 912 can be similarly structured as the first pipe receiver 911. A preload fastener 920 can also connect the first pipe receiver 911 to the second pipe receiver 1011 at loading member locations 912/1012 of the Whiffletree structure that are located opposite the fulcrum rod 915. The preload fastener 920 can be provided in the form of a bolt 921 and at least one nut 924 and can be adjustable (by turning the nuts 922 on the threaded bolt 921, or rod) to apply pressure from both the first pipe receiver 911 and the second pipe receiver 1011 onto their associated first and second flanges 941/951. Pressure can be evenly applied onto the flanges 941/951 by the contact members 930, which can have pivots implemented as flexures within the first pipe receiver 911 and the second pipe receiver 1011. A gasket 960 can sometimes be provided between the flanges 941/951 to create a better seal between them as pressure is applied to them by the contact members 930.

The Whiffletree-like structure 910 is now shown encompassing two pipes 940/950 with associated flanges 941/951 meeting and creating a seal together with pressure from two sections of the whiffletree structure 910 identified as including the first pipe receiver 911 and a second pipe receiver 912. The Whiffletree structure has the first pipe receiver 911 encompassing the first pipe 940 and a second pipe receiver 912 encompassing the second pipe 950. A fulcrum rod 915 connects a first loading member 912 of the first pipe receiver 911 to a second loading member 1012 of the second pipe receiver 1011. A preload fastener 920 also connects the first pipe receiver 911 to the second pipe receiver 912 at loading member locations of the Whiffletree structure that are located opposite the fulcrum rod 915. As mentioned, the preload fastener 920 can be provided in the form of a bolt 921 and a nut 924 and is adjustable to apply pressure from both the first pipe receiver 911 and the second pipe receiver 1011 onto their associated first and second flanges 941/951. Pressure can be evenly applied onto the flange ends 941/951 by contact members 930, with pivots implemented as flexures within the first pipe receiver 911 and the second pipe receiver 1011. Referring to FIG. 10B, a top view is provided of the first loading member 912 including a first fulcrum receiver 922 and a first preload fastener receiver 921 area (covered by nut 924).

Referring to FIG. 10C, a perspective view of the first pipe receiver 911 and second pipe receiver 1011 of the whiffletree structure 900 shown separated as they are placed over their perspective pipes 940/950. The fulcrum 915 is not yet connected to first and second fulcrum receivers 916/917 formed in the first and second load members 912/1012, respectively. The bolt 921 (or rod) and nut 924 (or nuts) comprising the preload fastener 920 are shown disconnected. Referring to FIG. 10C, the first and second loading members 912/1012 are slid along their respective pipes 940/950 until the contact members 930 come into contact with the flanges 941/942. The bolt 921 (shown as a threaded rod) can be fed through receiving holes of the first and second preload fastener receivers 923/1023 in the respective first and second loading members 912/1012. The fulcrum can then be slid into place into the fulcrum receivers 916/917. The nut 924 (or nuts) can also placed onto the bolt 921 (or threaded rod) and can be gradually tightened in order to create pressure onto the flanges 941/951 and ultimately create a seal with the flanges 941/951 once they are under equalized pressure from the contact members 930.

Figure 11A:
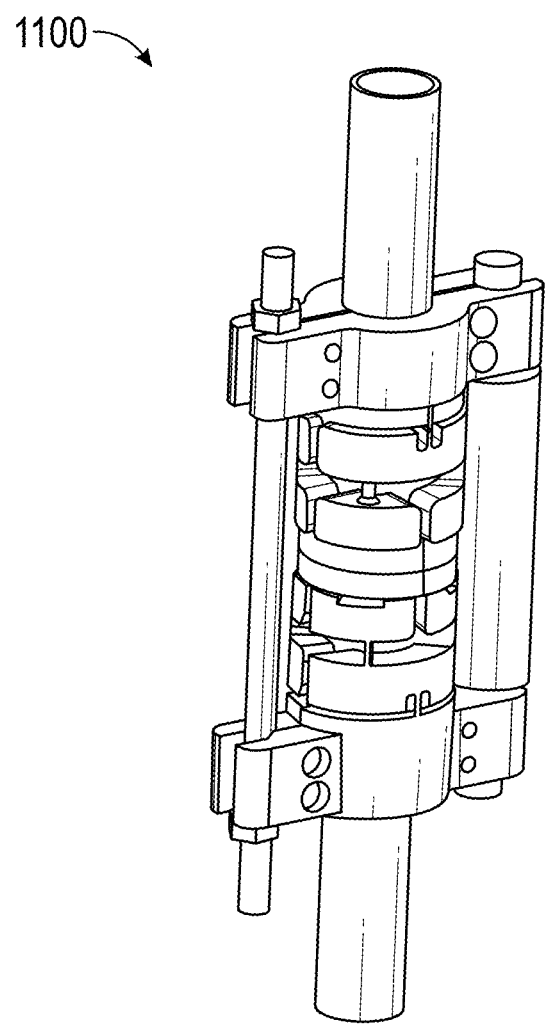
FIGS. 11A-11C illustrate a whiffletree structure providing closing sealing flanges in accordance with features of an alternate embodiment of the invention.
Figure 11B:
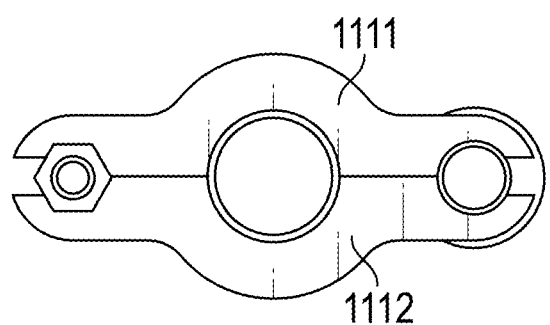
Figure 11C:
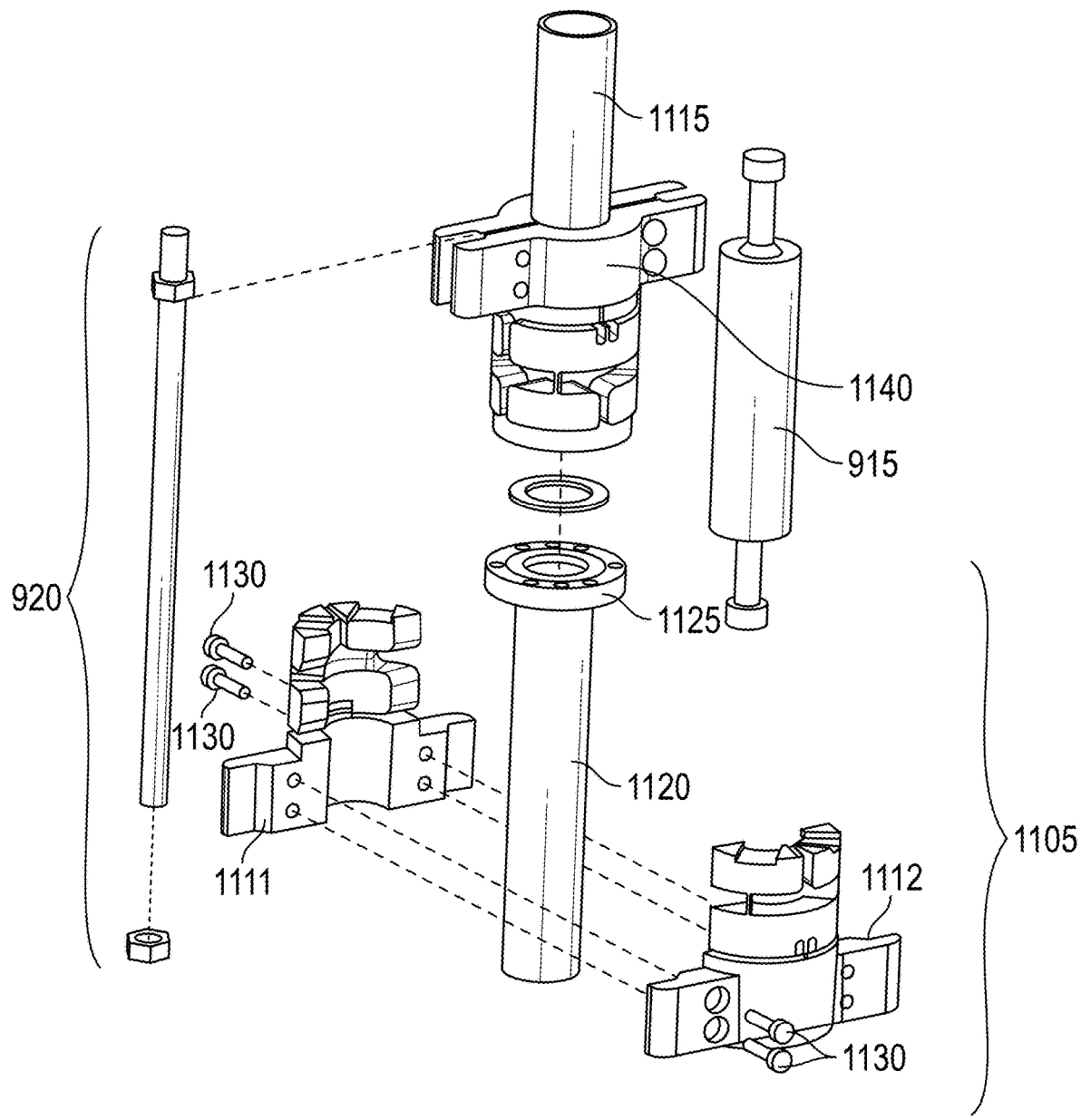

Referring to FIGS. 11A-11C, a whiffletree structure/closing sealing flanges is illustrated in accordance with features of an alternate embodiment of the invention. Referring to FIG. 11A, illustrated is a whiffletree structure 1100 incorporating a clamshell design. A clamshell design can be important where an existing pipe and flange arrangement cannot be disturbed (i.e., taken apart), but bolted collars securing the flanges together may need to be replaced. A clamshell designed with a whiffletree structure can be placed the existing pipe/flange arrangement because the whiffletree structure can be provided in two halved-portions. This may be best illustrated in FIGS. 11B and 11C where the two clamshell sections 1111/1112 of the whiffletree structure 1100 are identified. As illustrated in FIG. 11C, the two clamshell sections 1111/1112 of a second whiffletree section 1105 can be placed around a second pipe 1120 beneath the second flange 1125. The first clamshell section 1111 can be bolted to the second clamshell section 1112 with bolts 1130 as shown. Once, the first and second clamshell section 1111/1112 are secured together around the second pipe 1120, it can be secured to the first pipe receiver 1140 (shown in an assembled clamshell form around first pipe 1115 and ready for use) with a fulcrum 915 and preload fastener 920 as previously described with respect to FIGS. 10A-10C.

It will be appreciated that variations of the above-disclosed and other features and functions, or alternatives thereof, may be desirably combined into many other different systems or applications. Also, it should be understood that various presently unforeseen or unanticipated alternatives, modifications, variations or improvements therein could be subsequently made by those skilled in the art, which are also intended to be encompassed by the following claims.

The invention claimed is:

1. A system for sealing flanged connections, comprising:
   at least one loading member associated with a loading member layer adapted to receive a sealing force thereon;
   at least one intermediate member receiving the sealing force from the at least one loading member and adapted to distribute the sealing force to branch members in subsequent layers, wherein the at least one loading member is connected to the at least one intermediate member by pivot joints to permit relative motion between the at least one loading member and the at least one intermediate member; and
   at least one contact member adapted to apply the sealing force evenly around a flange and press a surface of the flange against at least one of a second flange surface or a cap to seal an opening associated with the flange via at least one of connection to the second flange surface or the cap.

2. The system of claim 1, wherein the at least one contact member applies the sealing force evenly around a flange via contact points coupled to the at least one contact member.

3. The system of claim 1, further comprising:
   at least two intermediate members in a 1st intermediate member layer each applying a load force to at least two additional intermediate members in a 2nd intermediate member layer, and the at least two additional intermediate members each apply the sealing force to at least two contact members.

4. The system of claim 3, wherein the at least two contact members apply the sealing force evenly around a flange via contact points coupled to each of the at least two contact members.

5. The system of claim 1, further comprising:
   at least two intermediate members in a 1st intermediate member layer each applying the sealing force to at least two additional intermediate members in a 2nd intermediate member layer, and the at least two additional intermediate members each apply the sealing force to at least two contact members, wherein the at least two contact members apply the sealing force evenly around a flange via contact points coupled to each of the at least two contact members.

6. The system of claim 1, wherein the pivots joints permit relative motion between members in adjacent layers.

7. The system of claim 6, wherein adjacent layers can accommodate pivots to achieve universal joint function, even where a tree formed by members is not branching.

8. A system for sealing flanged connections, comprising:
   at least one loading member associated with a loading member layer adapted to receive a sealing force thereon;
   at least two intermediate members receiving the sealing force from the at least one loading member and adapted to distribute a load force to branch members in subsequent layers; and
   at least two contact members receiving compression force from the at least two intermediate members and adapted to apply the sealing force evenly around a flange and press a surface of the flange against at least one of a second flange surface or a cap to seal an opening associated with the flange via at least one of connection to the second flange surface, or the cap.

9. The system of claim 8, wherein the at least one loading member is connected to the at least two intermediate members by pivot joints to permit relative motion between the at least one loading member and the at least two intermediate members.

10. The system of claim 9, wherein the pivot joints permit relative motion between members in adjacent layers.

11. The system of claim 8, wherein the at least two contact members apply the sealing force evenly around a flange via contact points coupled to the at least two contact members.

12. The system of claim 8, further comprising:
    at least two intermediate members in a 1st intermediate member layer each applying the sealing force to at least two additional intermediate members in a 2nd intermediate member layer, and the at least two additional intermediate members each apply the sealing force to at least two contact members.

13. The system of claim 12, wherein the at least two contact members apply the sealing force evenly around a flange via contact points coupled to each of the at least two contact members.

14. The system of claim 8, further comprising:
    at least two intermediate members in a 1st intermediate member layer each applying the load force to at least two additional intermediate members in a 2nd intermediate member layer, and the at least two additional intermediate members each apply the load force to the at least two contact members, wherein the at least two contact members apply the sealing force evenly around a flange via contact points coupled to each of the at least two contact members.

15. The system of claim 8, wherein adjacent layers can accommodate pivots even where a tree formed by members is not branching to achieve universal joint function.

16. A system for securing flanges, comprising:
    a first pipe receiving section including a first loading member and at least two pivot points adapted to interface with a first flange associated with a first pipe, wherein the at least two pivot points are distributed around the first flange and are connected to a first loading member of the first pipe receiving section via a first intermediate member layer and the first intermediate member layer is connected to the first loading member;

a second pipe receiving section including at least two second loading member pivot points adapted to interface with a second flange associated with a second pipe, wherein the at least two second loading member pivot points are distributed around the second flange and are connected to a second loading member of the second pipe receiving section via a second midsection and a second intermediate member layer is connected to a second base portion and a second contact member layer by a second plurality of pivots;

a fulcrum connecting the first loading member to the second loading member; and a preload fastener connecting the first loading member to the second loading member;

wherein the first pipe receiving section and the second pipe receiving section secure the first flange and associated first pipe together with the second flange and associated second pipe by a sealing force evenly distributed among the pivot points distributed about the first and second pipe receiving section as applied by the fulcrum and the preload fastener connecting a first loading member associated with the first pipe receiving section and a second loading member associated with the second pipe receiving section.

17. The system of claim 16, wherein the first pipe receiving section and the second pipe receiving section are provided in two halves and are securable around existing piping by a plurality of fasteners prior to securing the first pipe receiving section to the second pipe receiving section with the fulcrum and the preload fastener.

* * * * *